United States Patent
Yang et al.

(10) Patent No.: US 11,234,253 B2
(45) Date of Patent: Jan. 25, 2022

(54) TRANSMIT PARAMETER CONTROL

(71) Applicant: QUALCOMM Incorporated, San Diego, CA (US)

(72) Inventors: Wei Yang, San Diego, CA (US); Jing Jiang, San Diego, CA (US); Mostafa Khoshnevisan, San Diego, CA (US); Seyedkianoush Hosseini, San Diego, CA (US); Chih-Ping Li, San Diego, CA (US); Farhad Meshkati, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 16/584,087

(22) Filed: Sep. 26, 2019

(65) Prior Publication Data

US 2020/0107336 A1 Apr. 2, 2020

Related U.S. Application Data

(60) Provisional application No. 62/738,528, filed on Sep. 28, 2018.

(51) Int. Cl.
*H04W 72/12* (2009.01)
*H04W 72/14* (2009.01)

(52) U.S. Cl.
CPC ......... *H04W 72/121* (2013.01); *H04W 72/14* (2013.01)

(58) Field of Classification Search
CPC ............ H04W 72/042; H04W 72/121; H04W 72/1289; H04W 72/14
See application file for complete search history.

(56) References Cited

U.S. PATENT DOCUMENTS

| | | | |
|---|---|---|---|
| 2015/0009953 A1* | 1/2015 | Park | H04W 72/12 370/330 |
| 2017/0290046 A1 | 10/2017 | Sun et al. | |
| 2018/0288746 A1* | 10/2018 | Zhang | H04W 72/042 |
| 2018/0295651 A1* | 10/2018 | Cao | H04W 72/042 |
| 2019/0052432 A1* | 2/2019 | Islam | H04L 5/0005 |
| 2019/0132824 A1 | 5/2019 | Jeon et al. | |
| 2020/0367253 A1* | 11/2020 | Kim | H04W 72/042 |

(Continued)

OTHER PUBLICATIONS

International Search Report and Written Opinion—PCT/US2019/053466—ISA/EPO—dated Dec. 17, 2019.

(Continued)

*Primary Examiner* — Pao Sinkantarakorn
(74) *Attorney, Agent, or Firm* — Harrity & Harrity, LLP

(57) ABSTRACT

Various aspects of the present disclosure generally relate to wireless communication. In some aspects, a base station (BS) may transmit, and a user equipment (UE) may receive, a group-common downlink control information (DCI) message, wherein the group-common DCI message includes information identifying at least one communication parameter for a plurality of UEs. The BS and the UE may communicate in accordance with the at least one communication parameter based at least in part on the BS transmitting the group-common DCI message to the plurality of UEs and the UE receiving the group-common DCI message. Numerous other aspects are provided.

34 Claims, 11 Drawing Sheets

(56) References Cited

U.S. PATENT DOCUMENTS

2020/0374873 A1* 11/2020 Tiirola ............... H04W 72/042

OTHER PUBLICATIONS

LG Electronics: "Summary of [89-22] Email Discussion about UL data Ttansnission without UL Grant",3GPP Draft; R1-1710328 Summary of 89-22 Email Discussion on UL Transmisison Without UL Grant, 3rd General Partnershp Project (3GPP); Mobile Comgelence Centre; 650, Route Des Lucioles; F-06921 Sophia-Antipolis Cedex; France, vol. RAN WG1, No. Qingdao, P.R. China, Jun. 27, 2017-Jun. 30, 2017 Jun. 27, 2017, XP051305881, Retrieved from the Internet URL: http://www.3gpp.org/ftp/tsg_ran/WG1_RL1/TSGR1_AHNR_AH_1706/Docs/ [retrieved on Jun. 27, 2017], 41 pages.

Mediatek Inc: "Resource Sharing between PDCCH and PDSCH", 3GPP Draft; R1-1716199 Resource Sharing between PDCCH and PDSCH_Final, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017 Sep. 17, 2017, XP051339657, Retrieved from the Internet: URL:http://www.3gpp.org/ftp/Meetings_3GPP_SYNC/RAN1/Docs/ [retrieved on Sep. 17, 2017], 3 pages.

NTT Docomo et al., "Summary of Offline discussions on UL Transmission without UL Grant", 3GPP Draft; R1-1714813DOCX, 3rd Generation Partnership Project (3GPP), Mobile Competence Centre; 650, Route Des Lucioles; F-06921 Sophia-Antipolis Cedex; France, vol. RAN WG1, No. Prague, Czechia; Aug. 21, 2017-Aug. 25, 2017 Aug. 26, 2017, XP051328346, Retrieved from the Internet: URL:http://www.3gpp.org/ftp/tsg_ran/WG1_RL1/TSGR1_90/Docs/ [retrieved on Aug. 26, 2017], 21 pages.

* cited by examiner

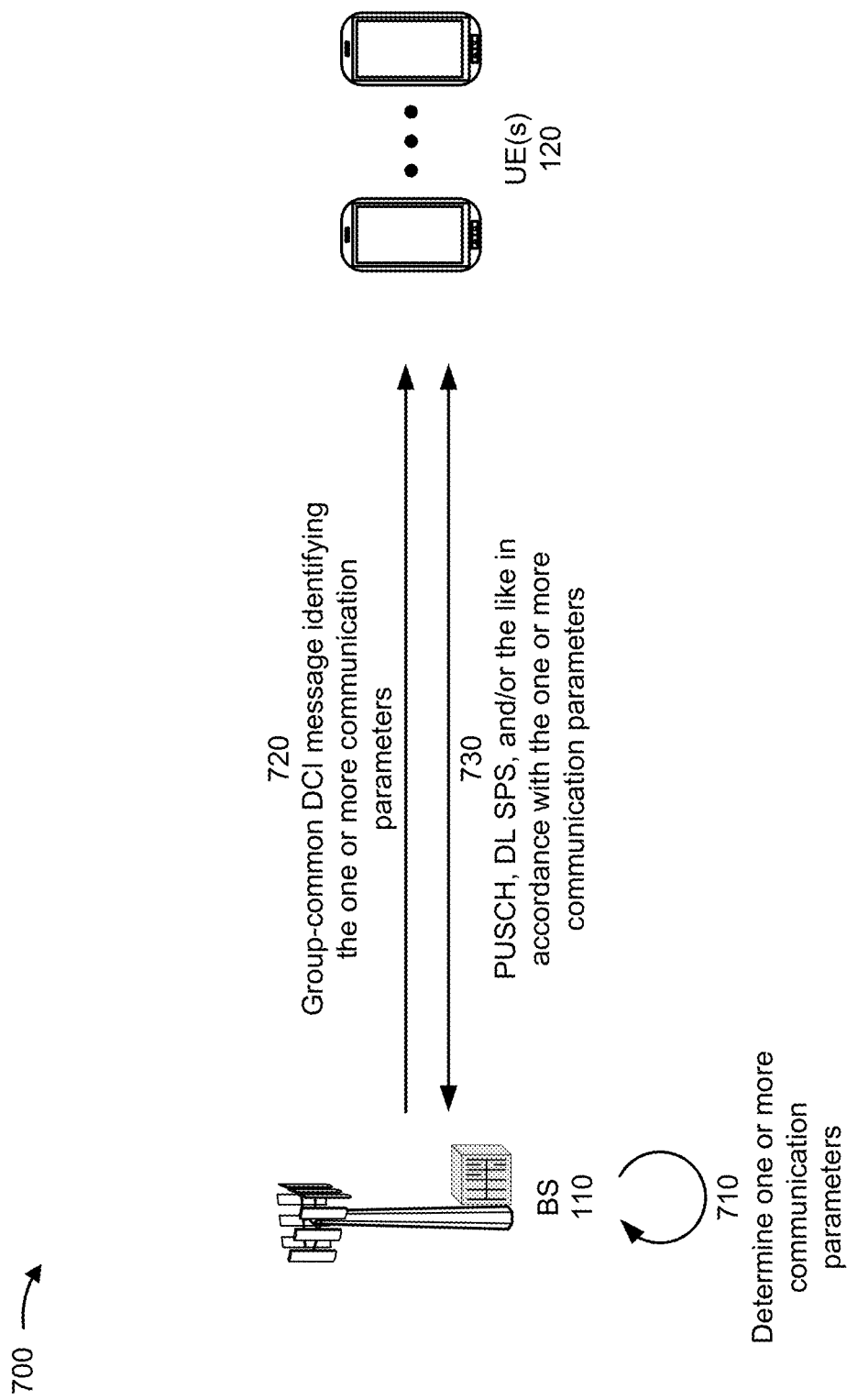

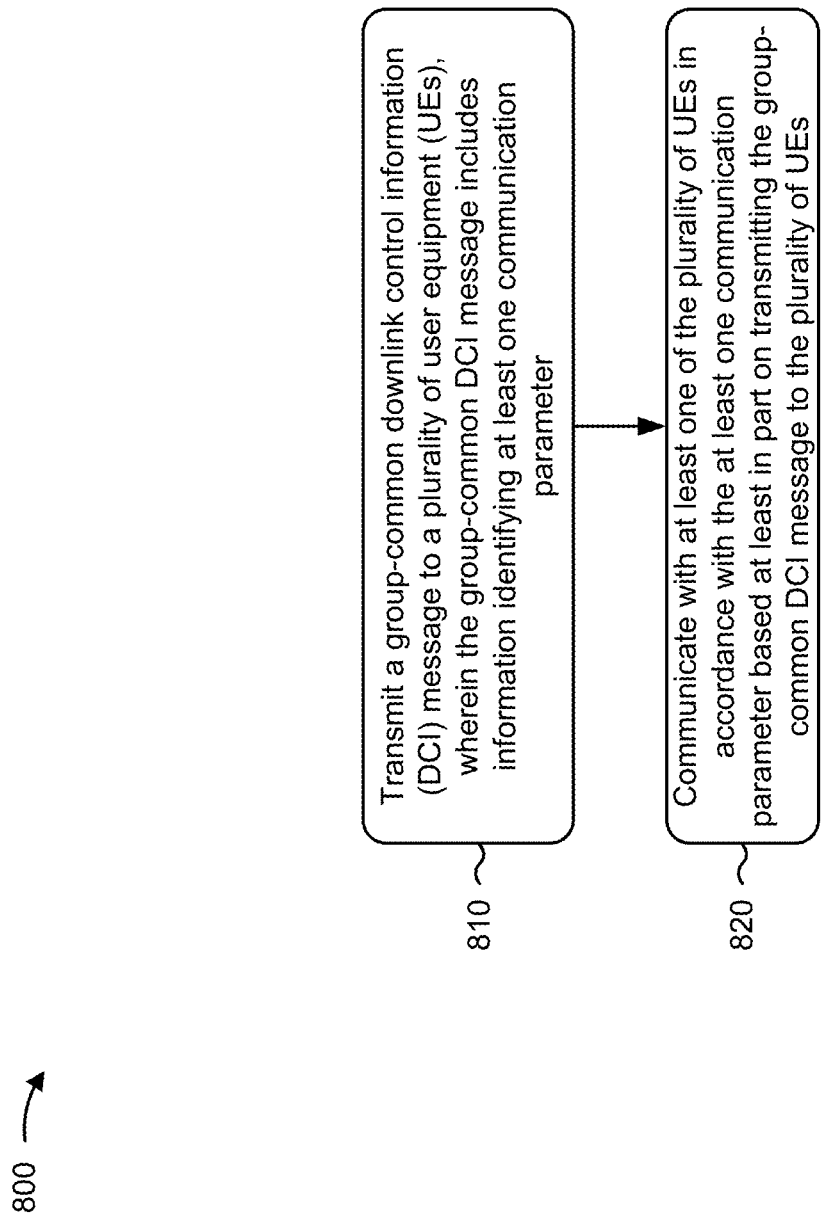

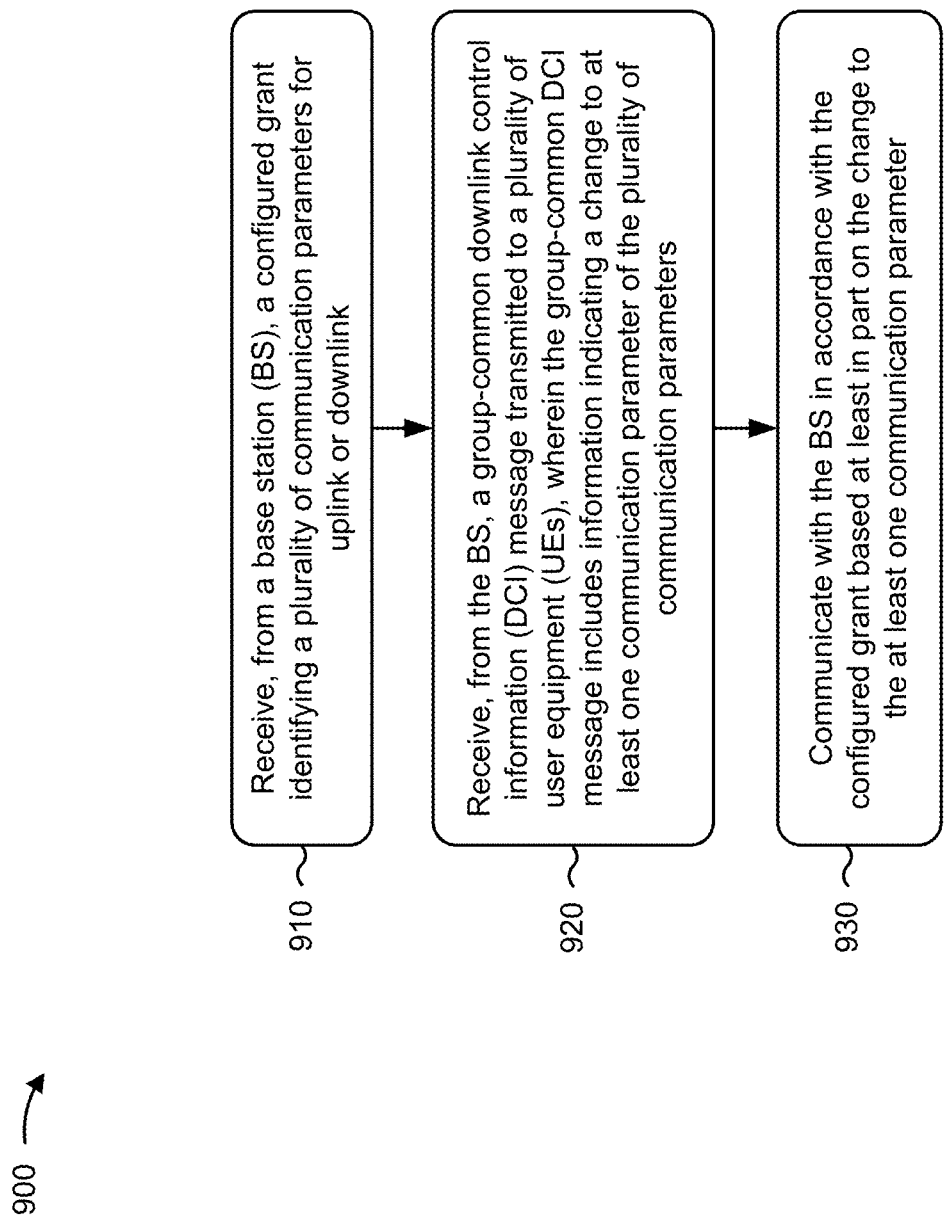

TRANSMIT PARAMETER CONTROL

CROSS-REFERENCE TO RELATED APPLICATION

This application claims priority to U.S. Provisional Patent Application No. 62/738,528, filed on Sep. 28, 2018, entitled "TRANSMIT PARAMETER CONTROL," which is hereby expressly incorporated by reference herein.

FIELD OF THE DISCLOSURE

Aspects of the present disclosure generally relate to wireless communication, and more particularly to techniques and apparatuses for transmit parameter control.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station (BS), may include transmitting a group-common downlink control information (DCI) message to a plurality of user equipment (UEs), wherein the group-common DCI message includes information identifying at least one communication parameter. The method may include communicating with at least one of the plurality of UEs in accordance with the at least one communication parameter based at least in part on transmitting the group-common DCI message to the plurality of UEs.

In some aspects, a base station for wireless communication may include memory and one or more processors coupled to the memory. The memory and the one or more processors may be configured to transmit a group-common downlink control information (DCI) message to a plurality of user equipment (UEs), wherein the group-common DCI message includes information identifying at least one communication parameter. The memory and the one or more processors may be configured to communicate with at least one of the plurality of UEs in accordance with the at least one communication parameter based at least in part on transmitting the group-common DCI message to the plurality of UEs.

In some aspects, a non-transitory computer-readable medium may store one or more instructions for wireless communication. The one or more instructions, when executed by one or more processors of a base station, may cause the one or more processors to transmit a group-common downlink control information (DCI) message to a plurality of user equipment (UEs), wherein the group-common DCI message includes information identifying at least one communication parameter. The one or more instructions, when executed by the one or more processors of the base station, may cause the one or more processors to communicate with at least one of the plurality of UEs in accordance with the at least one communication parameter based at least in part on transmitting the group-common DCI message to the plurality of UEs.

In some aspects, an apparatus for wireless communication may include means for transmitting a group-common downlink control information (DCI) message to a plurality of user equipment (UEs), wherein the group-common DCI message includes information identifying at least one communication parameter. The apparatus may include means for communicating with at least one of the plurality of UEs in accordance with the at least one communication parameter based at least in part on transmitting the group-common DCI message to the plurality of UEs.

In some aspects, a method of wireless communication, performed by a user equipment (UE), may include receiving, from a base station (BS), a configured grant identifying a plurality of communication parameters for uplink or downlink. The method may include receiving, from the BS, a group-common downlink control information (DCI) message transmitted to a plurality of user equipment (UEs), wherein the group-common DCI message includes information indicating a change to at least one communication parameter in plurality of communication parameters. The method may include communicating with the BS in accordance with the configured grant based at least in part on the change to the at least one communication parameter.

In some aspects, a user equipment for wireless communication may include memory and one or more processors coupled to the memory. The memory and the one or more processors may be configured to receive, from a base station (BS), a configured grant identifying a plurality of communication parameters for uplink or downlink. The memory and the one or more processors may be configured to receive, from the BS, a group-common downlink control information (DCI) message transmitted to a plurality of user equipment (UEs), wherein the group-common DCI message includes information indicating a change to at least one communication parameter in plurality of communication parameters. The memory and the one or more processors may be configured to communicate with the BS in accordance with the configured grant based at least in part on the change to the at least one communication parameter.

In some aspects, a non-transitory computer-readable medium may store one or more instructions for wireless communication. The one or more instructions, when executed by one or more processors of a user equipment, may cause the one or more processors to receive, from a base station (BS), a configured grant identifying a plurality of communication parameters for uplink or downlink. The one or more instructions, when executed by the one or more processors of the user equipment, may cause the one or more processors to receive, from the BS, a group-common downlink control information (DCI) message transmitted to a plurality of user equipment (UEs), wherein the group-common DCI message includes information indicating a change to at least one communication parameter in plurality of communication parameters. The one or more instructions, when executed by the one or more processors of the user equipment, may cause the one or more processors to communicate with the BS in accordance with the configured grant based at least in part on the change to the at least one communication parameter.

In some aspects, an apparatus for wireless communication may include means for receiving, from a base station (BS), a configured grant identifying a plurality of communication parameters for uplink or downlink. The apparatus may include means for receiving, from the BS, a group-common downlink control information (DCI) message transmitted to a plurality of user equipment (UEs), wherein the group-common DCI message includes information indicating a change to at least one communication parameter in plurality of communication parameters. The apparatus may include means for communicating with the BS in accordance with the configured grant based at least in part on the change to the at least one communication parameter.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7A and 7B are diagrams illustrating an example of transmit parameter control, in accordance with various aspects of the present disclosure.

FIG. 8 is a diagram illustrating an example process performed, for example, by a base station, in accordance with various aspects of the present disclosure.

FIG. 9 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
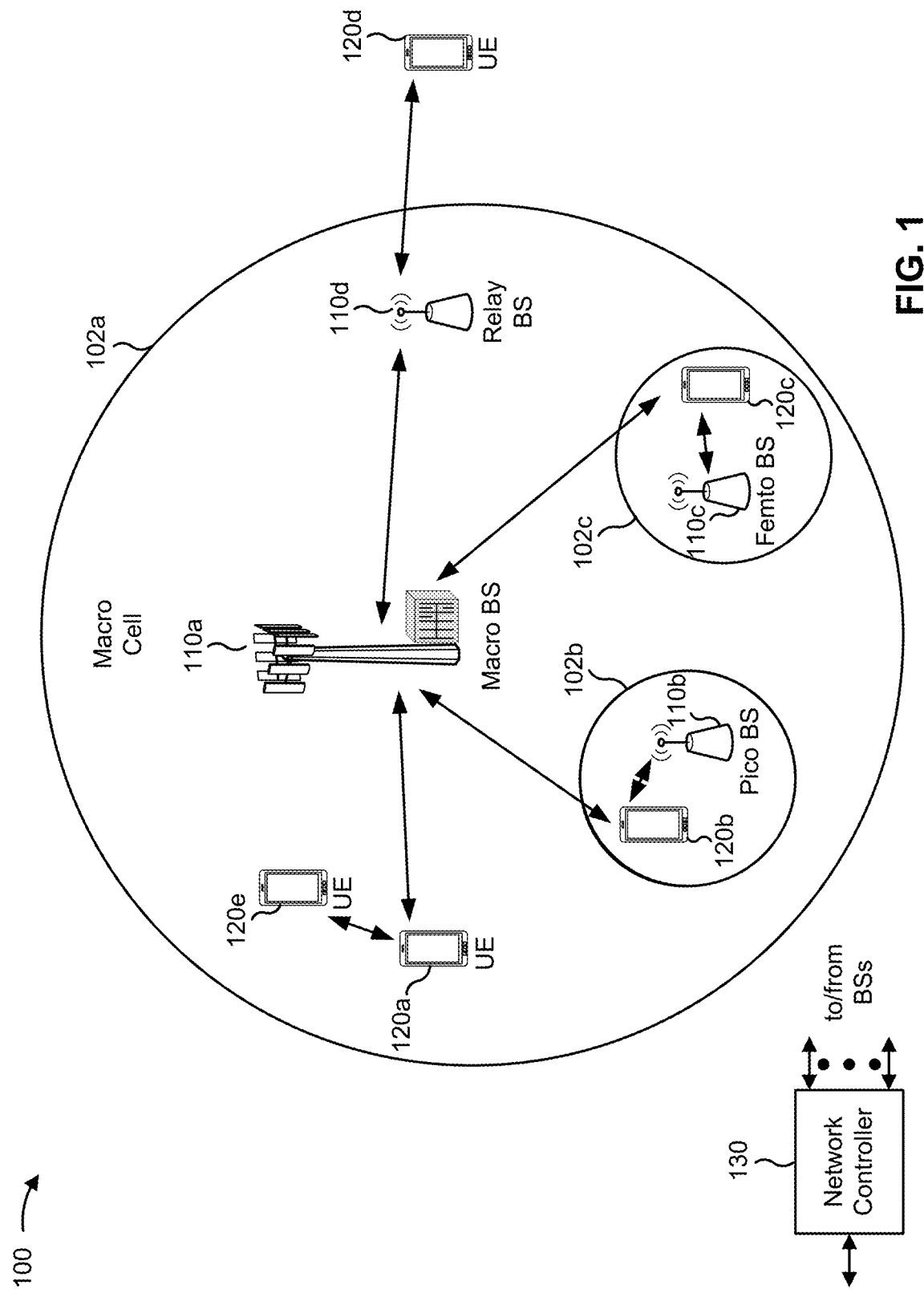
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
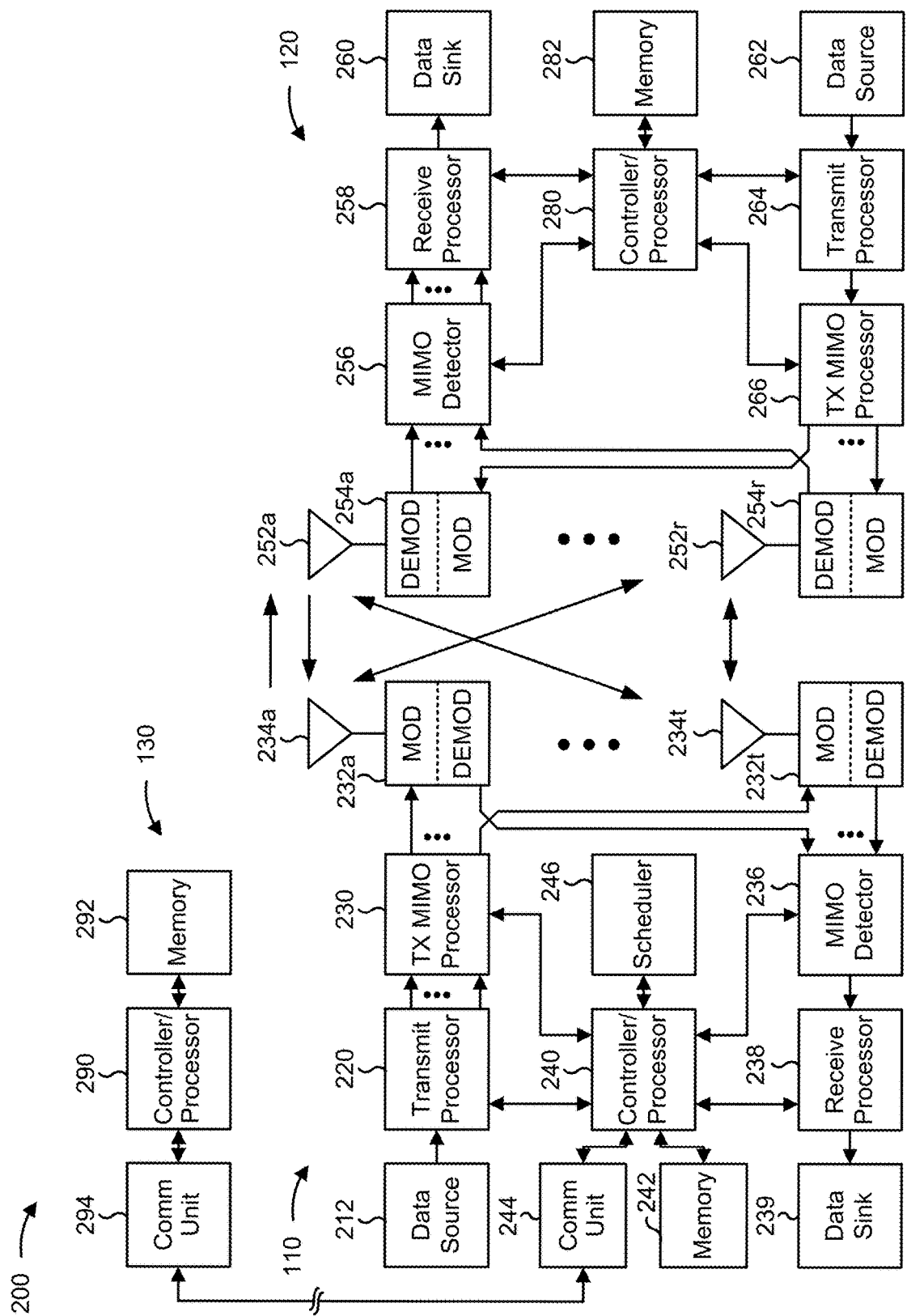
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with transmit parameter control, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving, from a base station (BS), a group-common downlink control information (DCI) message transmitted to a plurality of user equipment (UEs), wherein the group-common DCI message includes information identifying at least one communication parameter for the UE, means for communicating with the BS in accordance with the at least one communication parameter based at least in part on receiving the group-common DCI message transmitted to the plurality of UEs, and/or the like. In some aspects, such means may include one or more components of UE 120 described in connection with FIG. 2.

In some aspects, base station 110 may include means for transmitting a group-common downlink control information (DCI) message to a plurality of user equipment (UEs), wherein the group-common DCI message includes information identifying at least one communication parameter, means for communicating with at least one of the plurality of UEs in accordance with the at least one communication parameter based at least in part on transmitting the group-common DCI message to the plurality of UEs and/or the like. In some aspects, such means may include one or more components of base station 110 described in connection with FIG. 2.

As indicated above, FIG. 2 is provided merely as an example. Other examples may differ from what is described with regard to FIG. 2.

Figure 3A:
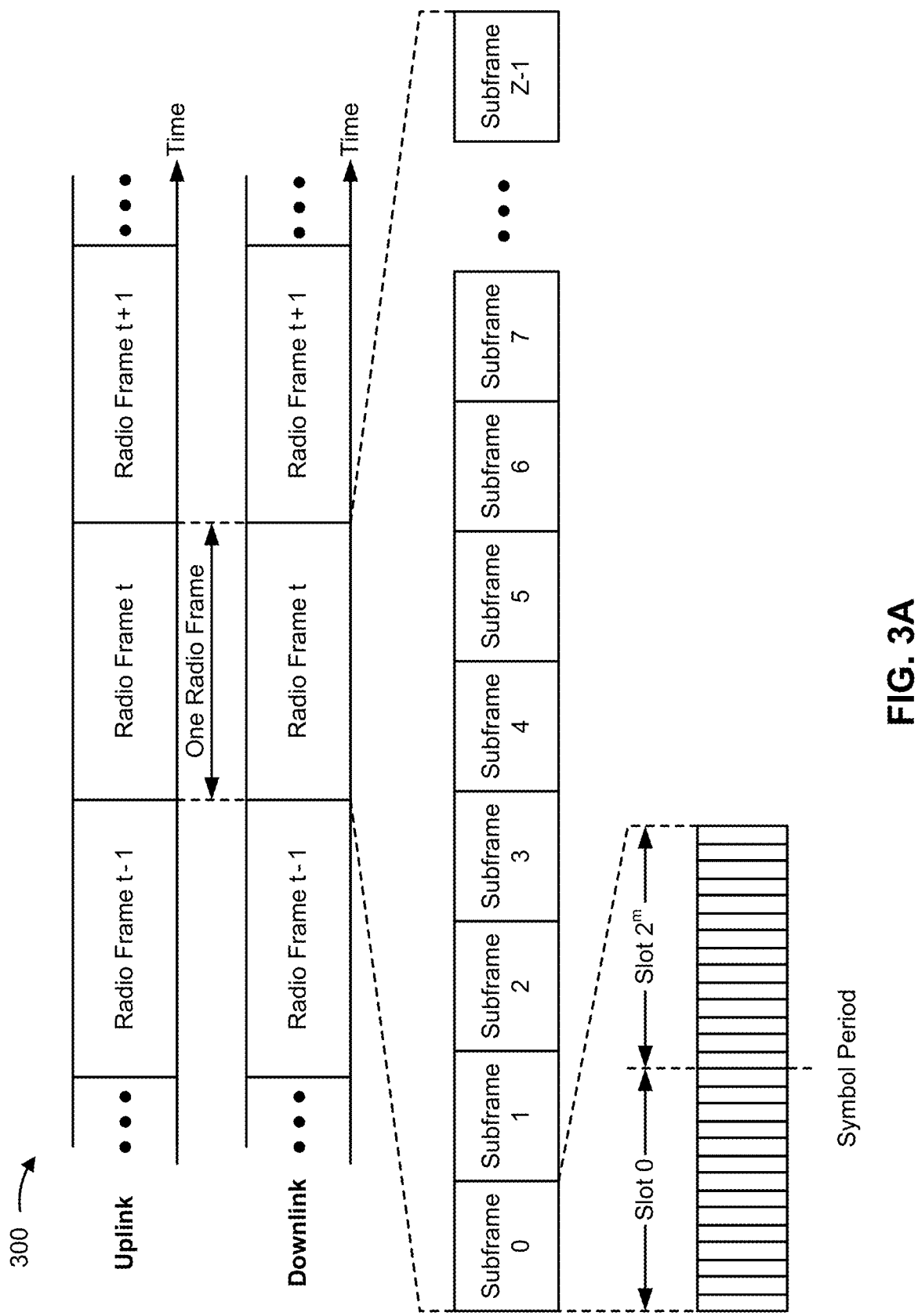
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z-1). Each subframe may have a predetermined duration (e.g., 1 ms) and may include a set of slots (e.g., 2' slots per subframe are shown in FIG. 3A, where m is a numerology used for a transmission, such as 0, 1,2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
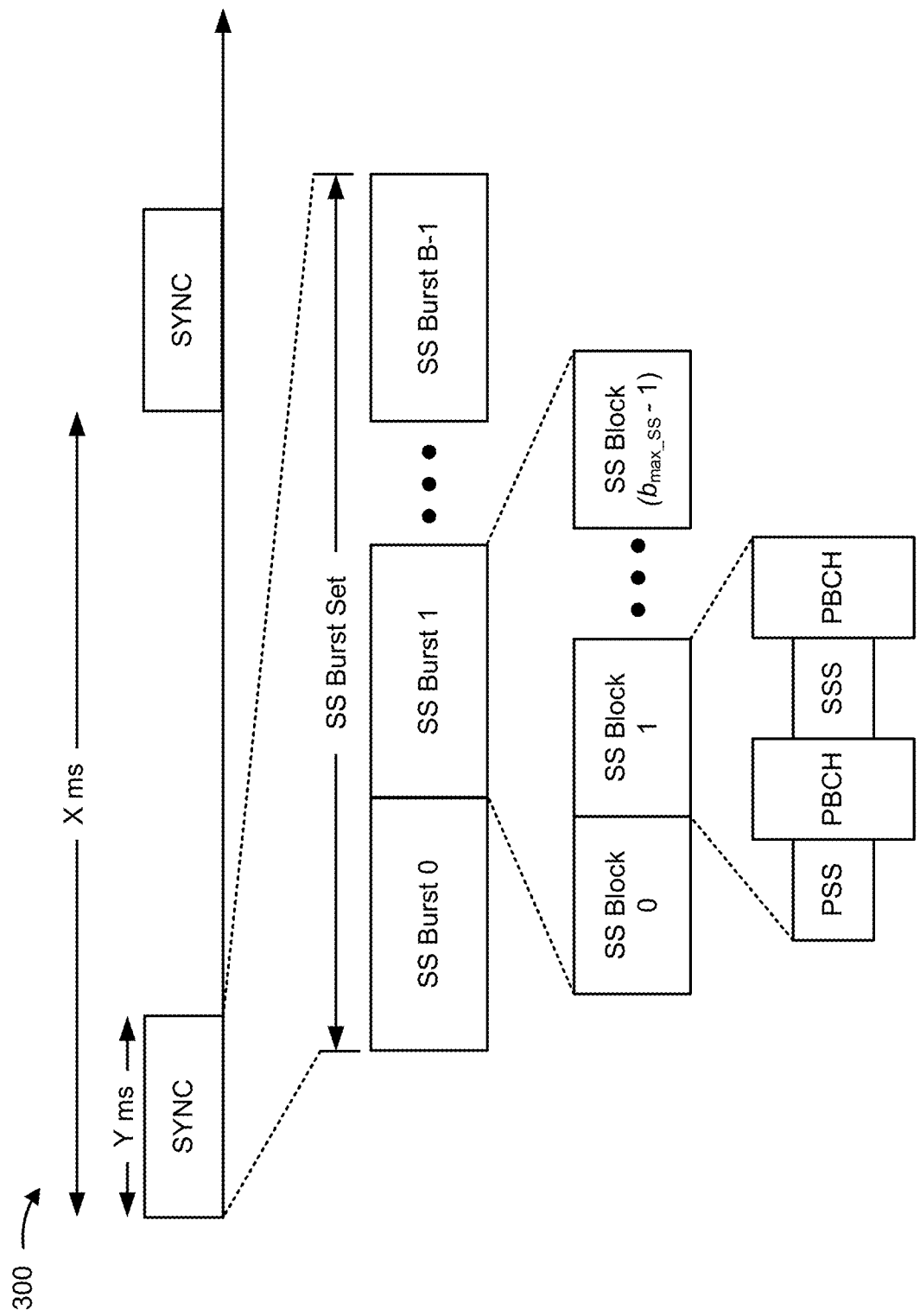
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS}$-1), where $b_{max\_SS}$-1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
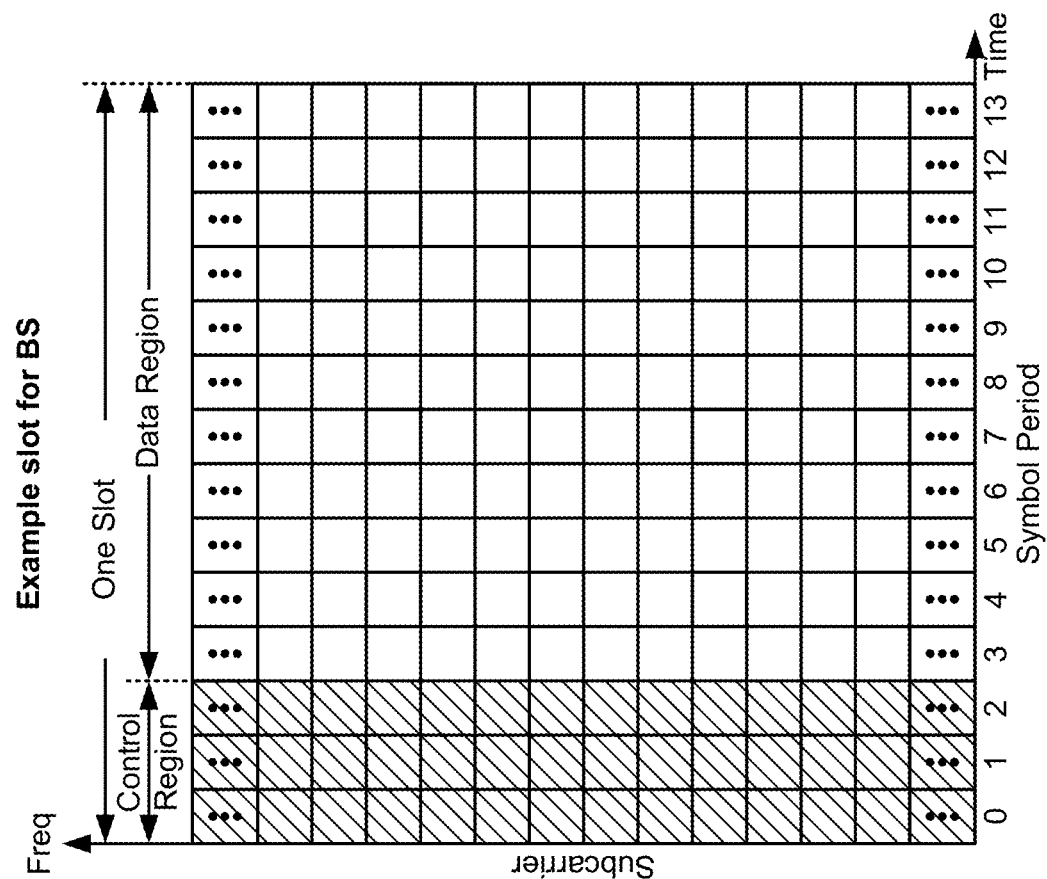
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using time division duplexing (TDD). NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 ms duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with pre-coding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
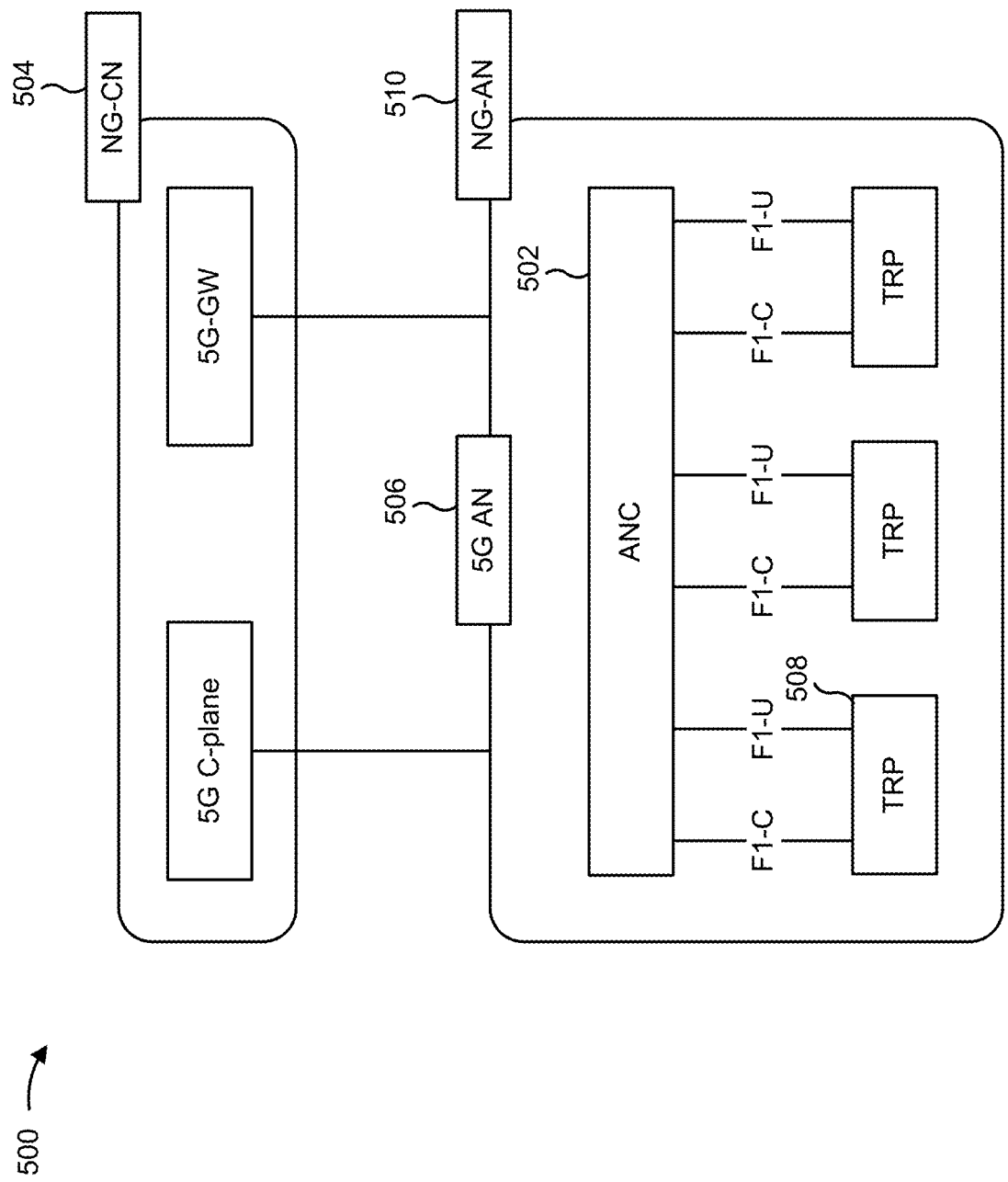
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
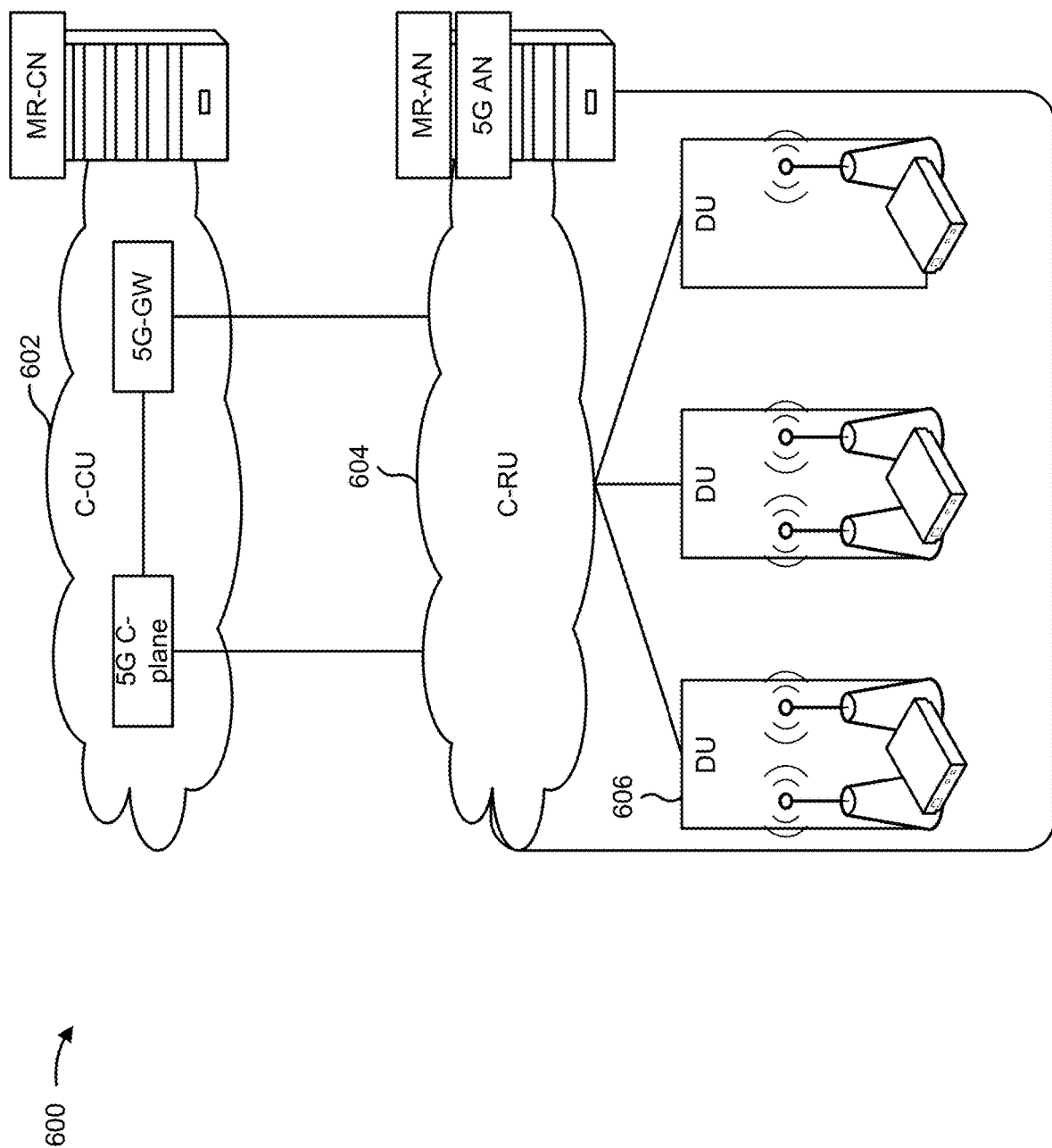
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

In some communications systems, such as 5G or NR, a BS may signal communication parameters to a UE to enable communication with the UE. However, for some types of communications, the BS may lack signaling to signal the communication parameters efficiently and in a timely manner. For example, when the BS is to receive a PUSCH transmission in connection with providing a radio resource control (RRC) configured grant, the BS may be configured to use RRC signaling to indicate an adjustment to a communication parameter for the PUSCH transmission, which may result in an excessive delay to indicate the adjustment. Similarly, when the UE is to transmit a PUSCH transmission in connection with a downlink control information (DCI) activation transmission or when the BS is to transmit a downlink semi-persistent scheduling (DL SPS) transmission, the BS may be configured to use the DCI activation message to signal an adjustment to a communication parameter for each UE of a plurality of UEs. In this case, signaling separate adjustments to each UE for which the BS is to adjust communication parameters may result in excessive utilization of network resources, excessive use of BS resources, and/or the like.

Some aspects described herein may enable signaling of a group-common DCI message to signal communication parameters for a plurality of UEs. For example, the BS may determine a change to at least one communication parameter, and may transmit the group-common DCI message to a plurality of UEs to indicate the change to the at least one communication parameter. In this case, the BS may communicate with at least one of the plurality of UEs, such as by transmitting a DL SPS transmission, receiving a PUSCH transmission, and/or the like. In this way, based at least in part on transmitting the group-common DCI message dynamically, the BS may reduce a delay in adjusting a communication parameter relative to using RRC signaling, and may reduce a utilization of network resources and BS resources relative to transmitting a plurality of UE-specific activation DCIs. Furthermore, based at least in part on signaling a change to a communication parameter rather than an absolute value for a communication parameter, the BS may reduce a utilization of network resources to transmit the group-common DCI message.

Figure 7B:
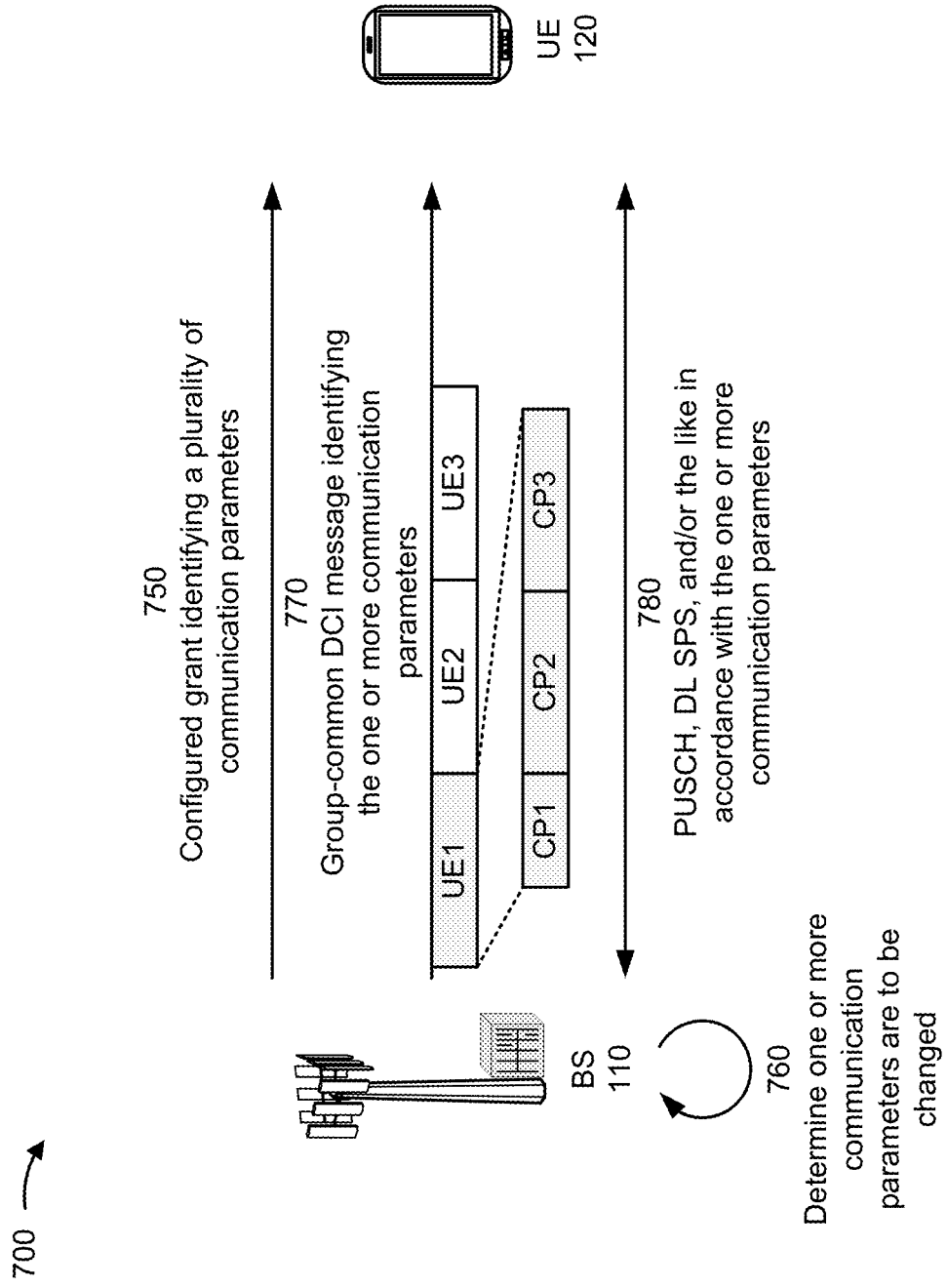

FIGS. 7A and 7B are diagrams illustrating examples 700 of transmit parameter control, in accordance with various aspects of the present disclosure. As shown in FIGS. 7A and 7B, example 700 includes a BS 110 and a plurality of UEs 120 (e.g., a first UE 120, a second UE 120, a third UE 120, and/or the like).

As further shown in FIG. 7A, and by reference number 710, BS 110 may determine one or more communication parameters. For example, BS 110 may determine that a current communication parameter value is to be changed relative to a previously signaled at least one communication parameter value. In this case, the BS 110 may have previously signaled a plurality of communication parameters using a configured grant (e.g., the configured grant may be signaled using radio resource control (RRC) signaling or is activated using an activation DCI), and may determine that the at least one communication parameter is to be changed from a previously signaled value to another value. In some aspects, BS 110 may determine a plurality of UEs 120 for which the one or more communication parameters are to be applied. For example, BS 110 may determine that, of a plurality of UEs 120 that are communicating with BS 110, a particular subset of the plurality of UEs 120 are to have a current communication parameter value changed to a different communication parameter value.

In some aspects, BS 110 may determine a particular type of communication parameter value, such as a modulation and coding scheme (MCS) parameter. Additionally, or alternatively, BS 110 may determine a resource allocation type of communication parameter, such as a starting resource block for a communication, a quantity of resource blocks allocated for the communication, a frequency hopping position for the communication, a starting orthogonal frequency division multiplexing (OFDM) symbol for the communication, a quantity of OFDM symbols to use for the communication, and/or the like. Additionally, or alternatively, BS 110 may determine a precoder type of communication parameter, such as which precoder to use for precoding. Additionally, or alternatively, BS 110 may determine a repetition parameter type of communication parameter, such as a quantity of repetitions of the communication to transmit, a slot bundling value for the communication, a mini-slot bundling value for the communication, and/or the like.

As further shown in FIG. 7A, and by reference number 720, BS 110 may transmit, and one or more UEs 120 may receive, a group-common DCI message identifying one or more communication parameters. For example, BS 110 may transmit the group-common DCI message to a plurality of UEs 120, such as a first UE 120, a second UE 120, a third UE 120, and/or the like, to adjust a communication parameter of the first UE 120, the second UE 120, the third UE 120, and/or the like. In this case, the group-common DCI message may include information for the plurality of UEs 120 (e.g., setting a communication parameter in common for the plurality of UEs 120) and/or UE-specific information (e.g., identifying a particular communication parameter for first UE 120, another particular communication parameter for second UE 120, and/or the like).

In some aspects, BS 110 may indicate a change to the communication parameter. For example, BS 110 may provide, using the group-common DCI message, an indicator that the communication parameter is to change from a first value to a second value, without providing information explicitly signaling the first value or the second value. In other words, BS 110 may provide a bit indicator indicating that a starting resource block is to be increased by a delta value to a new starting resource block, rather than signaling an absolute value of the new starting resource block. As another example, BS 110 may provide a bit indicator indicating that an MCS is to be increased by a delta value to a new MCS (e.g., based on an ordered set of MCSs), rather than signaling the MCS explicitly. In this way, BS 110 may decrease a size of the DCI message relative to signaling the absolute value, thereby reducing a utilization of network resources.

In some aspects, BS 110 may transmit information identifying an accumulative delta value. In this case, BS 110 may transmit an indicator identifying a change to the communication parameter value relative to a sequentially last value for the communication parameter. In some aspects, BS 110 may transmit information identifying an absolute delta value. In this case, BS 110 may transmit an indicator identifying a change to the communication parameter value relative to a sequentially first communication parameter value (e.g., an initial communication parameter value that may be configured based at least in part on an RRC configuration message or a DCI activation message).

In some aspects, BS 110 may signal an absolute value for a communication parameter. For example, when a size of an indicator to signal an absolute value for the communication parameter is less than a threshold, thereby obviating a reduction in a message size from using a delta value as an indicator, BS 110 may include an indicator of the absolute value in the group-common DCI message. In some aspects, BS 110 may implicitly signal a communication parameter value using the group-common DCI message. For example, BS 110 may include an indicator of an MCS, based at least in part on which UE 120 may derive an allocated quantity of resource blocks (e.g., without BS 110 explicitly signaling the allocated quantity of resource blocks), thereby reducing a size of the group-common DCI message and reducing a utilization of network resources.

In some aspects, BS 110 may include an indicator of when a change to a communication parameter is to become effective. For example, BS 110 may include a k0 indicator identifying a quantity of slots between reception of a downlink group-common DCI message and when a communication parameter value change is to become effective. Similarly, BS 110 may include a k2 indicator identifying a quantity of slots between reception of an uplink group-common DCI message and when a communication parameter value change is to become effective. In this case, UE 120 may apply the communication parameter value change and communicate in accordance with the communication parameter value change after the time at which the communication parameter value change is to become effective. Additionally, or alternatively, UE 120 may communicate using an original communication parameter before applying the communication parameter value change based at least in part on the indicator of when the change to the communication parameter is to become effective. In some aspects, the time is a UE-specific time indicated by a field of the group-common DCI message (e.g., each of the plurality of UEs is associated with a corresponding time field) that indicates when the parameter value change is to become effective. In some aspects, the time is non-UE-specific (e.g., the time is a group-common time field applicable to each UE of the plurality of UEs).

In some aspects, UE 120 may apply the communication parameter value change based at least in part on a timing of receiving the group-common DCI message. For example, UE 120 may determine to apply the communication parameter value change based at least in part on receiving the group-common DCI message a threshold quantity of symbols before a PUSCH transmission is scheduled. In contrast, if the group-common DCI message is not received the threshold quantity of symbols before the PUSCH transmission is scheduled, UE 120 may determine to apply a same communication parameter as was used for a previous transmission using a same configured grant as for the transmission of the PUSCH. This may occur as a result of insufficient processing time at the UE to apply the communication parameter value change between the reception of the DCI and the transmission of the PUSCH. In this case, UE 120 may apply the communication parameter indicated by the group-common DCI message after a PUSCH transmission and for another PUSCH transmission.

In some aspects, UE 120 may monitor for the group-common DCI message based at least in part on a monitoring parameter. For example, before BS 110 transmits and UE 120 receives the group-common DCI message, BS 110 may transmit RRC signaling to UE 120 to configure one or more monitoring parameters for UE 120, such as a radio network temporary identifier (RNTI), a size of the group-common DCI message, a resource location of control information for UE 120, and/or the like. In some aspects, UE 120 may monitor for different group-common DCI messages. For example, UE 120 may monitor for a first type of group-common DCI message (e.g., a downlink group-common DCI message) for a DL SPS transmission with a first size or a first RNTI, and may monitor for a second type of group-common DCI message (e.g., an uplink group-common DCI message) for a PUSCH transmission with a configured grant with a second size or a second RNTI. Additionally, or alternatively, the first type of group-common DCI message and the second type of group-common DCI message may be associated with a common size (e.g., based at least in part on adding padding bits) and a common RNTI. In this case, UE 120 may determine whether a received group-common DCI message is the first type (e.g., a DL group-common DCI for a DL SPS) or the second type (e.g., a UL group-common DCI for a PUSCH with a configured grant) based at least in part on a bit indicator included in the received group-common DCI message.

In some aspects, UE 120 may determine that the group-common DCI message is a group-common DCI message and not a re-activation DCI. For example, UE 120 may parse the group-common DCI message to determine that the group-common DCI message is a group-common DCI message based at least in part on an RNTI of the group-common DCI message, a DCI format of the group-common DCI message, a bit indicator included in the group-common DCI message, and/or the like.

In some aspects, UE 120 may determine a bandwidth part switching command included in the group-common DCI message. For example, UE 120 may process the group-common DCI message to identify a UE-specific bandwidth part switch indicator, a bandwidth part switch indicator for, and common to, the plurality of UEs 120, and/or the like. Additionally, or alternatively, UE 120 may identify a starting resource block, a quantity of resource blocks, a frequency hopping offset, and/or the like for an active bandwidth part, a previous bandwidth part, and/or the like. In this case, a reference point for applying a communication parameter change may be reception of the group-common DCI message by UE 120, a completion of a bandwidth part switch, the later one of the reception and the completion, and/or the like. Further, a change to a communication parameter value may be relative to a communication parameter value for a bandwidth part to which UE 120 switches.

As further shown in FIG. 7A, and by reference number 730, BS 110 and UE 120 may communicate in accordance with the one or more communication parameters. For example, BS 110 may transmit a DL SPS transmission to UE 120 in accordance with the one or more communication parameters, and UE 120 may receive the DL SPS transmission. Additionally, or alternatively, UE 120 may transmit a PUSCH transmission in accordance with the one or more communication parameters, and BS 110 may receive the PUSCH transmission. In this case, the one or more communication parameters may be applied to the DL SPS transmission and/or the PUSCH transmission, and may not be applied to other transmissions, such as dynamically scheduled uplink transmissions or downlink transmissions.

In some aspects, BS 110 may communicate with the plurality of UEs 120 in accordance with the one or more communication parameters. For example, based at least in part on setting the one or more communication parameters using the group-common DCI message, BS 110 may transmit to and/or receive from the plurality of UEs 120, thereby reducing a delay in setting a communication parameter and/or reducing a utilization of network resources to set a communication parameter.

As shown in FIG. 7B, and by reference number 750, in a similar scenario, BS 110 may transmit a configured grant to UE 120. For example, BS 110 may transmit the configured grant, which may identify a sequence of communication opportunities between the BS 110 and the UE 120, and may identify a plurality of communication parameters relating to the sequence of communication opportunities. For example, the configured grant may correspond to a downlink semi-persistent scheduling transmission. In this case, one or more of the plurality of communication parameters may be transmitted from the BS 110 to the UE 120 via the activation DCI of the downlink semi-persistent scheduling transmission. In another example, the configured grant may correspond to a sequence of physical uplink shared channel transmissions, which do not need to be activated. In this case, the plurality of communication parameters may be included in the configured grant configuration. As shown by reference number 760, at a subsequent time, BS 110 may determine that one or more communication parameters are to be changes. For example, BS 110 may determine that a value for a communication parameter, of the plurality of communication parameters indicated in the configured grant, is to be changed to a different value.

As further shown in FIG. 7B, and by reference number 770, BS 110 may transmit a group-common DCI message identifying the one or more communication parameters. For example, BS 110 may indicate a change to a value of at least one communication parameter of the plurality of communication parameters using a group-common DCI message transmitted to UE 120. In this case, the group-common DCI message may include a UE specific region (UE1) that may include one or more fields to update one or more communication parameters. For example, a first field (CP1) may indicate an update to a first communication parameter indicated in the configured grant, a second field (CP2) may indicate an update to a second communication parameter indicated in the configured grant, a third field (CP3) may indicate an update to a third communication parameter indicated in the configured grant, and/or the like. As shown by reference number 780, based at least in part on the update to the one or more communication parameters, BS 110 and UE 120 may communicate (e.g., using a PUSCH transmission) in accordance with the one or more communication parameters.

As indicated above, FIGS. 7A and 7B are provided as examples. Other examples may differ from what is described with respect to FIGS. 7A and 7B.

FIG. 8 is a diagram illustrating an example process 800 performed, for example, by a BS, in accordance with various aspects of the present disclosure. Example process 800 is an example where a BS (e.g., BS 110) performs transmit parameter control.

As shown in FIG. 8, in some aspects, process 800 may include transmitting a group-common downlink control information (DCI) message to a plurality of user equipment (UEs), wherein the group-common DCI message includes information identifying at least one communication parameter (block 810). For example, the BS (e.g., using controller/processor 240, transmit processor 220, TX MIMO processor 230, MOD 232, antenna 234, and/or the like) may transmit a group-common downlink control information (DCI) message to a plurality of user equipment (UEs), wherein the group-common DCI message includes information identifying at least one communication parameter, as described in more detail above. In some aspects, the group-common DCI message relates to communications associated with at least one of a downlink semi-persistent scheduling transmission or a physical uplink shared channel transmission with a configured grant.

As shown in FIG. 8, in some aspects, process 800 may include communicating with at least one of the plurality of UEs in accordance with the at least one communication parameter based at least in part on transmitting the group-common DCI message to the plurality of UEs (block 820).

For example, the BS (e.g., using antenna 234, DEMOD 232, MIMO detector 236, receive processor 238, controller/processor 240, transmit processor 220, TX MIMO processor 230, MOD 232, antenna 234, and/or the like) may communicate with at least one of the plurality of UEs in accordance with the at least one communication parameter based at least in part on transmitting the group-common DCI message to the plurality of UEs, as described in more detail above.

Process 800 may include additional aspects, such as any single aspect or any combination of aspects described below and/or in connection with one or more other processes described elsewhere herein.

In a first aspect, the group-common DCI message includes first information relating to the plurality of UEs and second information that is UE-specific. In a second aspect, alone or in combination with the first aspect, the group-common DCI message relates to communications associated with at least one of a downlink semi-persistent scheduling transmission or a physical uplink shared channel transmission with a configured grant. In a third aspect, alone or in combination with one or more of the first and second aspects, the BS may transmit a configured grant including a plurality of communication parameters, wherein the BS is configured to modify one or more of the plurality of communication parameters in accordance with the at least one communication parameter.

In a fourth aspect, alone or in combination with one or more of the first through third aspects, the at least one communication parameter is at least one of a modulation and coding scheme parameter, a resource allocation parameter, a starting resource block parameter, a quantity of resource blocks parameter, a frequency hopping position parameter, a starting orthogonal frequency division multiplexing (OFDM) parameter, a quantity of OFDM symbols parameter, a repetition parameter, a repetition quantity parameter, an uplink precoder parameter, a slot bundling parameter, or a mini-slot bundling parameter. In a fifth aspect, alone or in combination with one or more of the first through fourth aspects, the group-common DCI message indicates a change of the at least one communication parameter relative to a previously signaled at least one communication parameter.

In a sixth aspect, alone or in combination with one or more of the first through fifth aspects, the BS is configured to indicate the at least one communication parameter to enable a determination of at least one other communication parameter. In a seventh aspect, alone or in combination with one or more of the first through sixth aspects, the group-common DCI message indicates a change of the at least one communication parameter relative to an initial value for the at least one communication parameter. In an eighth aspect, alone or in combination with one or more of the first through seventh aspects, the group-common DCI message indicates a time at which the at least one communication parameter becomes effective; and the BS is configured to communicate with the at least one of the plurality of UEs after the time at which the at least one communication parameter becomes effective.

In a ninth aspect, alone or in combination with one or more of the first through eighth aspects, the BS is configured to communicate with the at least one of the plurality of UEs using a previously signaled at least one communication parameter after transmitting the group-common DCI message and before the at least one communication parameter becomes effective. In a tenth aspect, alone or in combination with one or more of the first through ninth aspects, the BS is configured to transmit a radio resource control (RRC) message identifying a set of monitoring parameters for the plurality of UEs to monitor for the group-common DCI message; and the BS is configured to transmit the group-common DCI message in accordance with the set of monitoring parameters. In an eleventh aspect, alone or in combination with one or more of the first through tenth aspects, the group-common DCI message is one of a first type of group-common DCI message with a first size or a first radio network temporary identifier (RNTI) for a first type of communication, or a second type of group-common DCI message with a second size, different from the first size, or a second RNTI different from the first RNTI for a second type of communication.

In a twelfth aspect, alone or in combination with one or more of the first through eleventh aspects, the first type of communication is a downlink communication and the second type of communication is an uplink communication. In a thirteenth aspect, alone or in combination with one or more of the first through twelfth aspects, the group-common DCI message includes a bit indicator to indicate whether the group-common DCI message is to apply to uplink communications or downlink communications. In a fourteenth aspect, alone or in combination with one or more of the first through thirteenth aspects, the group-common DCI message includes an indication of a type of the group-common DCI message.

In a fifteenth aspect, alone or in combination with one or more of the first through fourteenth aspects, the group-common DCI message includes a bandwidth part switching indicator. In a sixteenth aspect, alone or in combination with one or more of the first through fifteenth aspects, the bandwidth part switching indicator is associated with the at least one of the plurality of UEs or with all of the plurality of UEs. In a seventeenth aspect, alone or in combination with one or more of the first through sixteenth aspects, the at least one communication parameter is applicable to communications using one or more bandwidth parts, of a plurality of bandwidth parts, associated with the bandwidth part switching indicator.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a UE, in accordance with various aspects of the present disclosure. Example process 900 is an example where a UE (e.g., UE 120) performs transmit parameter control.

As shown in FIG. 9, in some aspects, process 900 may include receiving, from a base station (B S), a configured grant identifying a plurality of communication parameters for uplink or downlink (block 910). For example, the UE (e.g., using antenna 252, DEMOD 254, MIMO detector 256, receive processor 258, controller/processor 280, and/or the like) may receive, from a base station (BS), a configured grant identifying a plurality of communication parameters for uplink or downlink, as described in more detail above.

As shown in FIG. 9, in some aspects, process 900 may include receiving, from the BS, a group-common downlink control information (DCI) message transmitted to a plurality of user equipment (UEs), wherein the group-common DCI message includes information indicating a change to at least one communication parameter in the plurality of communication parameters, wherein the group-common DCI message relates to communications associated with at least one of a downlink semi-persistent scheduling transmission or a physical uplink shared channel transmission with a configured grant (block 920). For example, the UE (e.g., using antenna 252, DEMOD 254, MIMO detector 256, receive processor 258, controller/processor 280, and/or the like) may receive, from the BS, a group-common downlink control information (DCI) message transmitted to a plurality of user equipment (UEs), wherein the group-common DCI message includes information indicating a change to at least one communication parameter in the plurality of communication parameters, as described in more detail above. In some aspects, the group-common DCI message relates to communications associated with at least one of a downlink semi-persistent scheduling transmission or a physical uplink shared channel transmission with a configured grant.

As shown in FIG. 9, in some aspects, process 900 may include communicating with the BS in accordance with the configured grant based at least in part on the change to the at least one communication parameter (block 930). For example, the UE (e.g., using antenna 252, DEMOD 254, MIMO detector 256, receive processor 258, controller/processor 280, transmit processor 264, TX MIMO processor 266, MOD 254, antenna 252, and/or the like) may communicate with the BS in accordance with the configured grant based at least in part on the change to the at least one communication parameter, as described in more detail above.

Process 900 may include additional aspects, such as any single aspect or any combination of aspects described below and/or in connection with one or more other processes described elsewhere herein.

In a first aspect, the group-common DCI message includes first information relating to the plurality of UEs and second information specific to the UE, and wherein the UE is configured to identify the first information and the second information based at least in part on receiving the group-common DCI message. In a second aspect, alone or in combination with the first aspect, the group-common DCI message relates to communications associated with at least one of a downlink semi-persistent scheduling transmission or a physical uplink shared channel transmission with a configured grant. In a third aspect, alone or in combination with one or more of the first and second aspects, the at least one communication parameter is at least one of a modulation and coding scheme parameter, a resource allocation parameter, a starting resource block parameter, a quantity of resource blocks parameter, a frequency hopping position parameter, a starting orthogonal frequency division multiplexing (OFDM) parameter, a quantity of OFDM symbols parameter, a repetition parameter, a repetition quantity parameter, an uplink precoder parameter, a slot bundling parameter, or a mini-slot bundling parameter. In a fourth aspect, alone or in combination with one or more of the first through third aspects, the group-common DCI message indicates a change of the at least one communication parameter relative to a previously signaled at least one communication parameter.

In a fifth aspect, alone or in combination with one or more of the first through fourth aspects, the UE is configured to determine at least one other communication parameter based at least in part on the at least one communication parameter. In a sixth aspect, alone or in combination with one or more of the first through fifth aspects, the group-common DCI message indicates a change of the at least one communication parameter relative to an initial value for the at least one communication parameter. In a seventh aspect, alone or in combination with one or more of the first through sixth aspects, the group-common DCI message indicates a time at which the at least one communication parameter becomes effective; and UE is configured to communicate with the BS after the time at which the at least one communication parameter becomes effective.

In an eighth aspect, alone or in combination with one or more of the first through seventh aspects, the UE is configured to communicate with the BS using a different communication parameter than the at least one communication parameter after receiving the group-common DCI message and before the at least one communication parameter becomes effective. In a ninth aspect, alone or in combination with one or more of the first through eighth aspects, the UE is configured to receive a radio resource control (RRC) message identifying a set of monitoring parameters for the UE to monitor for the group-common DCI message; and the UE is configured to monitor for the group-common DCI message in accordance with the set of monitoring parameters. In a tenth aspect, alone or in combination with one or more of the first through ninth aspects, the group-common DCI message is one of a first type of group-common DCI message with a first size or a first radio network temporary identifier (RNTI) for a first type of communication, or a second type of group-common DCI message with a second size, different from the first size, or a second RNTI different from the first RNTI for a second type of communication.

In an eleventh aspect, alone or in combination with one or more of the first through tenth aspects, the first type of communication is a downlink communication and the second type of communication is an uplink communication. In a twelfth aspect, alone or in combination with one or more of the first through eleventh aspects, the group-common DCI message includes a bit indicator to indicate whether the group-common DCI message is to apply to uplink communications or downlink communications. In a thirteenth aspect, alone or in combination with one or more of the first through twelfth aspects, the group-common DCI message includes an indication of a type of the group-common DCI message.

In a fourteenth aspect, alone or in combination with one or more of the first through thirteenth aspects, the group-common DCI message includes a bandwidth part switching indicator. In a fifteenth aspect, alone or in combination with one or more of the first through fourteenth aspects, the bandwidth part switching indicator is associated with the UE or with all of the plurality of UEs. In a sixteenth aspect, alone or in combination with one or more of the first through fifteenth aspects, the at least one communication parameter may be applicable to communications using one or more bandwidth parts, of a plurality of bandwidth parts, associated with the bandwidth part switching indicator. In a seventeenth aspect, alone or in combination with one or more of the first through sixteenth aspects, the at least one communication parameter is applied based at least in part on a timing of the group-common DCI message. In an eighteenth aspect, alone or in combination with one or more of the first through seventeenth aspects, the time is a UE-specific time for the UE or a non-UE-specific time common to the plurality of UEs.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a base station (BS), comprising:
    transmitting a group-common downlink control information (DCI) message to a plurality of user equipment (UEs), wherein the group-common DCI message includes information identifying a time at which at least one communication parameter becomes effective; and
    communicating with at least one of the plurality of UEs using a different communication parameter, different from the at least one communication parameter, after transmitting the group-common DCI message to the plurality of UEs and before the at least one communication parameter becomes effective.

2. The method of claim 1, further comprising:
transmitting a configured grant including a plurality of communication parameters,
wherein the BS is configured to transmit the group-common DCI message to modify one or more of the plurality of communication parameters in accordance with the at least one communication parameter.

3. The method of claim 1, further comprising:
transmitting a configured grant,
wherein the configured grant corresponds to communications associated with at least one of a downlink semi-persistent scheduling transmission or a physical uplink shared channel transmission.

4. The method of claim 1, wherein the group-common DCI message includes first information relating to the plurality of UEs and second information that is UE-specific.

5. The method of claim 1, wherein the at least one communication parameter is at least one of:
a modulation and coding scheme parameter,
a resource allocation parameter,
a starting resource block parameter,
a quantity of resource blocks parameter,
a frequency hopping position parameter,
a starting orthogonal frequency division multiplexing (OFDM) parameter,
a quantity of OFDM symbols parameter,
a repetition quantity parameter,
an uplink precoder parameter,
a slot bundling parameter, or
a mini-slot bundling parameter.

6. The method of claim 1, wherein the BS is configured to indicate the at least one communication parameter to enable a determination of at least one other communication parameter.

7. The method of claim 1,
wherein the BS is configured to communicate with the at least one of the plurality of UEs after the time at which the at least one communication parameter becomes effective.

8. The method of claim 1, wherein the group-common DCI message further indicates an accumulative delta value identifying a change to the at least one communication parameter value relative to a sequentially last value for the at least one communication parameter.

9. The method of claim 1, wherein the group-common DCI message further indicates an absolute delta value identifying a change to the at least one communication parameter value relative to a sequentially first value for the at least one communication parameter.

10. The method of claim 1, wherein the group-common DCI message includes a k0 indicator identifying a quantity of slots between reception of a downlink group-common DCI message.

11. The method of claim 1, wherein the group-common DCI message includes a k2 indicator identifying a quantity of slots between reception of an uplink group-common DCI message.

12. A method of wireless communication performed by a user equipment (UE), comprising:
receiving, from a base station (BS), a configured grant identifying a plurality of communication parameters for uplink or downlink transmission;
receiving, from the BS, a group-common downlink control information (DCI) message transmitted to a plurality of user equipment (UEs), wherein the group-common DCI message indicates a time at which at least one communication parameter, of the plurality of communication parameters, becomes effective; and
communicating with the BS using a previously signaled at least one communication parameter after receiving the group-common DCI message and before the at least one communication parameter becomes effective based on the time indicated in the group-common DCI message.

13. The method of claim 12, wherein the configured grant corresponds to communications associated with at least one of a downlink semi-persistent scheduling transmission or a physical uplink shared channel transmission.

14. The method of claim 12, wherein the configured grant is received via a radio resource control (RRC) signal or is activated via an activation DCI.

15. The method of claim 12, wherein the group-common DCI message includes first information common to the plurality of UEs and second information specific to the UE, and wherein the UE is configured to identify the first information and the second information based at least in part on receiving the group-common DCI message.

16. The method of claim 12, wherein the at least one communication parameter is applied based at least in part on the time at which the at least one communication parameter becomes effective.

17. The method of claim 12,
wherein the group-common DCI message further indicates a delta value to the at least one communication parameter relative to a previously signaled value, and
wherein the delta value to the at least one communication parameter indicates a change to at least one of:
a modulation and coding scheme parameter,
a resource allocation parameter,
a starting resource block parameter,
a quantity of resource blocks parameter,
a frequency hopping position parameter,
a starting orthogonal frequency division multiplexing (OFDM) parameter,
a quantity of OFDM symbols parameter,
a repetition quantity parameter,
an uplink precoder parameter,
a slot bundling parameter, or
a mini-slot bundling parameter.

18. The method of claim 12, wherein the UE is configured to determine at least one other communication parameter based at least in part on the at least one communication parameter.

19. The method of claim 12,
wherein UE is configured to communicate with the BS in accordance with the configured grant after the time at which the at least one communication parameter becomes effective.

20. The method of claim 12, wherein the time is indicated in a UE-specific time field dedicated for the UE or a non-UE-specific time field dedicated to the plurality of UEs.

21. The method of claim 12, wherein the UE is configured to receive a radio resource control (RRC) message identifying a set of monitoring parameters for the UE to monitor for the group-common DCI message; and
wherein the UE is configured to monitor for the group-common DCI message in accordance with the set of monitoring parameters.

22. The method of claim 12, wherein the group-common DCI message is one of:

a first type of group-common DCI message with a first size or a first radio network temporary identifier (RNTI) for a first type of communication, or a second type of group-common DCI message with a second size, different from the first size, or a second RNTI different from the first RNTI for a second type of communication.

23. The method of claim 22, wherein the first type of communication is a downlink communication and the second type of communication is an uplink communication.

24. The method of claim 12, wherein the group-common DCI message includes a bit indicator to indicate whether the group-common DCI message is to apply to uplink communications or downlink communications.

25. A base station (BS) for wireless communication, comprising:
a memory; and
one or more processors coupled with the memory, the memory and the one or more processors configured to:
transmit a group-common downlink control information (DCI) message to a plurality of user equipment (UEs), wherein the group-common DCI message includes information identifying a time at which at least one communication parameter becomes effective; and
communicate with at least one of the plurality of UEs using a different communication parameter, different from the at least one communication parameter, after transmitting the group-common DCI message to the plurality of UEs and before the at least one communication parameter becomes effective.

26. The BS of claim 25, wherein the one or more processors are further configured to:
transmit a configured grant including a plurality of communication parameters,
wherein the BS is configured to transmit the group-common DCI message to modify one or more of the plurality of communication parameters in accordance with the at least one communication parameter.

27. A user equipment (UE) for wireless communication, comprising:
a memory; and
one or more processors coupled with the memory, the memory and the one or more processors configured to:
receive, from a base station (BS), a configured grant identifying a plurality of communication parameters for uplink or downlink transmission;
receive, from the BS, a group-common downlink control information (DCI) message transmitted to a plurality of user equipment (UEs), wherein the group-common DCI message indicates a time at which at least one communication parameter, of the plurality of communication parameters, becomes effective; and
communicate with the BS using a previously signaled at least one communication parameter after receiving the group-common DCI message and before the at least one communication parameter becomes effective based on the time indicated in the group-common DCI message.

28. The UE of claim 27, wherein the configured grant corresponds to communications associated with at least one of a downlink semi-persistent scheduling transmission or a physical uplink shared channel transmission.

29. The UE of claim 27, wherein the configured grant is received via a radio resource control (RRC) signal or is activated via an activation DCI.

30. The UE of claim 27, wherein the group-common DCI message includes first information common to the plurality of UEs and second information specific to the UE.

31. The UE of claim 27, wherein the group-common DCI message further indicates an accumulative delta value identifying a change to the at least one communication parameter value relative to a sequentially last value for the at least one communication parameter.

32. The UE of claim 27, wherein the group-common DCI message further indicates an absolute delta value identifying a change to the at least one communication parameter value relative to a sequentially first value for the at least one communication parameter.

33. The UE of claim 27, wherein the group-common DCI message includes a k0 indicator identifying a quantity of slots between reception of a downlink group-common DCI message.

34. The UE of claim 27, wherein the group-common DCI message includes a k2 indicator identifying a quantity of slots between reception of an uplink group-common DCI message.

* * * * *